US010565622B1

(12) United States Patent
Burstein et al.

(10) Patent No.: US 10,565,622 B1
(45) Date of Patent: Feb. 18, 2020

(54) OPTIMIZATION OF REAL-TIME PROBABILISTIC MODEL EVALUATION FOR ONLINE ADVERTISING

(71) Applicant: Amazon Technologies, Inc., Seattle, WA (US)

(72) Inventors: Jonathan Lee Burstein, Seattle, WA (US); Jim Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 960 days.

(21) Appl. No.: 14/667,521

(22) Filed: Mar. 24, 2015

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0275* (2013.01)

(58) Field of Classification Search
None
See application file for complete search history.

(56) References Cited

U.S. PATENT DOCUMENTS

| 2006/0212897 A1* | 9/2006 | Li | H04H 60/58 725/32 |
| 2011/0191170 A1* | 8/2011 | Zhang | G06Q 30/0247 705/14.46 |
| 2013/0060631 A1* | 3/2013 | Corson | G06Q 30/0241 705/14.46 |
| 2014/0032326 A1* | 1/2014 | Li | G06Q 30/0266 705/14.58 |
| 2014/0067533 A1* | 3/2014 | Gandhi | G06Q 30/02 705/14.53 |
| 2016/0155141 A1* | 6/2016 | Song | G06O 30/0242 705/14.41 |
| 2016/0267531 A1* | 9/2016 | Zheng | G06O 30/0275 |

OTHER PUBLICATIONS

"Using large-scale brain simulations for machine learning and A.I." by Dean, Jeff et al. Google Official Blog. (7 pgs.).

* cited by examiner

*Primary Examiner* — Eric R Netzloff
*Assistant Examiner* — Christopher Stroud
(74) *Attorney, Agent, or Firm* — Eversheds Sutherland (US) LLP

(57) ABSTRACT

Systems, methods, and computer-readable media are disclosed for optimization of real-time probabilistic model evaluation for online advertising. In one embodiment, a system may receive a bid request for an ad slot, and may receive cached user information with a first ad and a first ad score, and a second ad and a second ad score. The system may generate a first estimated probability of conversion associated with presentation of the first ad to the user, and may generate a second estimated probability of conversion associated with presentation of the second ad to the user based at least in part on the context information, the second ad identifier, and the second ad score. The system may select either the first ad or the second ad for which to generate a bid amount based at least in part on the first estimated probability of conversion and the second estimated probability of conversion.

18 Claims, 6 Drawing Sheets

OPTIMIZATION OF REAL-TIME PROBABILISTIC MODEL EVALUATION FOR ONLINE ADVERTISING

BACKGROUND

Advertisers may develop ad campaigns with advertisements for delivery to potential consumers. Advertisers may have specific delivery goals for delivery of advertisements, which may be designed to achieve certain outcomes. In some instances, advertisers may partner with service providers or other entities to deliver advertisements in an optimal manner. In such instances, certain audiences may be more receptive to particular advertisements, and may therefore be targeted by the respective advertisements. Advertising slots for online advertising may be subject to a bidding process, in which the advertisement associated with the highest bid may be presented to a user. Bid amounts may be submitted within a short period of allotted time, such that a winning bid can be determined for presentation to a user reasonably quickly. However, entities that generate bids may have numerous potential advertisements from which to select for bid amount generation, and may be unable to evaluate each potential advertisement during the time allotted for bid amount submissions. As a result, advertisements may be presented in a suboptimal manner leading to reduced effectiveness and increased costs of an ad campaign.

Figure 1:
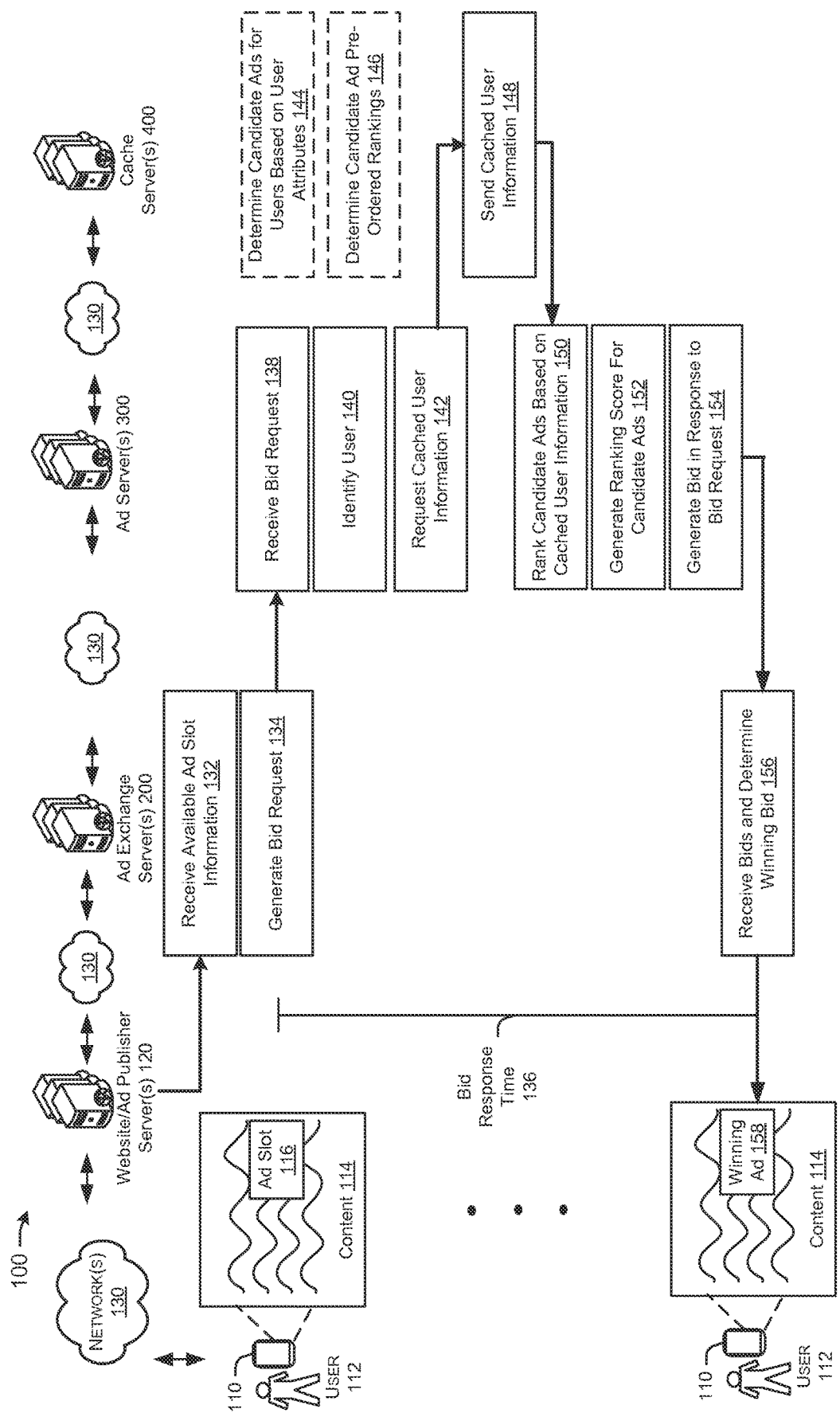
FIG. 1 is an example dataflow for optimizing real-time probabilistic model evaluation in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

In the context of online advertising, an advertisement may be delivered for presentation (e.g., rendering) in an advertising slot. Presentation of the advertisement in an advertising slot may be referred to as serving an advertisement impression. As used herein, the terms "advertising slot" or "available advertising slot" may refer generally to a location, environment, or placeholder in which, or in connection with which, an impression of an advertisement may be served. In a more specific context, these terms may refer to, for example, a particular location on a web page at which an impression of an advertisement may be presented to and potentially consumed by a user. A collection of available advertisements that may be presented in advertising slots may be referred to herein as "advertisement inventory." Further, the terms "delivery of an advertisement," "delivery of an advertisement impression," "presentment of an advertisement impression," "serving an ad impression," or any other similar term may be used interchangeably throughout this disclosure.

This disclosure relates to, among other things, systems, methods, computer-readable media, techniques, and methodologies for optimization of real-time probabilistic model evaluation for online advertising. Advertisers may develop ad campaigns with specific goals, such as increasing awareness of the ad campaign, increasing or improving consumer engagement, increasing product sales, and the like. To accomplish the goals of the ad campaign, an advertiser may desire to present ads to target consumers identified by various targeting criteria, such as age or age range, demographics, geographic location, gender, or other criteria. Online users may have certain user attributes that remain relatively steady or otherwise static over time. For example, a user in the 18-30 year age group may remain in the same age group for up to 12 years. Similarly, a user with a gender identified as male may be unlikely to be later identified as female. In responding to a bid request for an available advertising slot, some servers may evaluate individual attributes of the user to which the ad impression will be presented in order to determine whether the user fits the targeting criteria of the ad campaign. In doing so, the server may consume valuable time, as the allotted time for responding to the bid request may be 100 milliseconds or less. Accordingly, the server may only consider a portion of available advertising inventory before submitting a bid, which may be for a suboptimal advertisement.

Embodiments of the disclosure relate to caching user information, such as user attributes, and in some instances, advertisements selected for potential presentation to specific users, such that upon receiving a bid request for a certain user, embodiments herein may access the cached user information to identify relevant advertisements and evaluate the subset of relevant advertisements to select an advertisement for which to generate a bid. As a result, latency in responding to a bid request may be reduced, and embodiments of the disclosure may analyze or otherwise evaluate a greater number of advertisements available for presentation to the user.

In embodiments of the disclosure, advertisements available in advertising inventory may be pre-matched with users by a cache server that caches user information and provides the cached user information to a remote server periodically or on demand, such that the remote server may generate a bid amount for an advertisement based at least in part on the cached user information. By evaluating additional advertisements in ranking advertisements or generating bids, the remote server may reach more target consumers and/or have improved effectiveness by reaching consumers more likely to take action based on the ad campaign.

To optimally deliver ad impressions, certain embodiments of the systems and methods described herein may reduce latency in responding to bid requests and may evaluate a relatively high number of candidate advertisements to identify an ad that may have the highest expected value for presentation to a specific user. The reduced latency may facilitate consideration of additional ad metrics by the ad server, such as budget consumption rates for an ad campaign, delivery metrics, performance metrics, and the like.

Certain embodiments of the systems and methods described herein may optimize real-time probabilistic model evaluation for online advertising by caching relatively static features to consider in responding to bid requests, such as user attributes or preferences. Caching these features may facilitate additional time in which to evaluate probabilistic models and select an advertisement for which an expected value and/or probability of action may be highest, resulting in improved ad campaign effectiveness. Probability of action may be indicative of the chance that the potential consumer to which the ad impression was served will act or react in a certain manner intended by the advertiser. The action an advertiser intends for the potential consumer to engage in may be, for example, to purchase a product, to watch a movie advertised in the ad impression, to consume media included in the ad impression, and the like. In one example, if the ad campaign is directed towards selling cell phones, ad impressions delivered by certain embodiments of the systems and methods described herein may be served to potential consumers that may be interested in cell phones, such as potential consumers on a website with content related to cell phone discount deals.

To serve ad impressions in an online context, ad campaigns or related parties may be subject to a bidding process for an available ad slot, in which the ad impression of the winning bidder will be served. Before an ad impression is served to a potential consumer, an entity, such as an ad exchange system, may send a bid request for an advertisement to display in connection with an available advertising slot. The bid request may include ad slot information related to the specific available ad slot, such as a user identifier or user information related to the user to which the ad impression will be served, website content or context, location information, chronological information, and other related information. The ad exchange system may include one or more ad exchange servers that facilitate bidding on advertising inventory. A collection of advertising inventory may be received by the ad exchange system from various website publishers, search engines, or other advertising publishers. More specifically, the advertising inventory, or information indicative thereof, may be received by the ad exchange system from website publisher computers, search engine computers, or other advertising publisher computers that server one or more web pages with which an advertising slot is associated. The ad exchange system may send a bid request to various entities for an advertisement to be displayed or otherwise presented or served in connection with an available advertising slot. Various entities, such as ad servers or ad delivery servers, may be capable of communicating with the ad exchange system to submit bids in response to the bid request for the opportunity to present an ad impression in connection with the available advertising slot. In certain embodiments described herein, an ad server may be one ad server in a fleet of ad servers.

The bidding process may occur in real-time as bid requests for available advertising slots are received. In one or more representative scenarios, the entire time from transmission of the bid request from the ad exchange system to a bidding entity and receipt of a bid amount from the bidding entity by the ad exchange system may span approximately 100 milliseconds.

The bidding entities may include the advertisers themselves or third parties bidding on behalf of advertisers. In the case of third party bidders, the bidders may be under a contractual obligation to present a certain number of impressions of one or more advertisements forming part of one or more advertising campaigns. Advertisers may desire that ad impressions be served to users that match particular targeting criteria, or target consumers that match predefined user attributes in order to increase brand awareness and maximize the effects on the online behavior of users exposed to the campaign. Effectiveness of an ad campaign or impact of ads on online behavior of users may be measured in accordance with any suitable advertising performance metric such as a click-through rate, a number of clicks, a number of page views, a number of searches, and so forth.

In response to a bid request, bids may be submitted to the ad exchange system by various entities competing for the opportunity to present an advertisement impression for the available advertising slot. The bidder that submits the highest bid amount for a particular advertising slot may win the right to deliver an ad impression for that ad slot.

Before submitting a bid in the embodiments described herein, an ad server that receives a bid request for an available ad slot may determine a ranking of candidate advertisements based on an evaluation of the available ad slot information received from the ad exchange server and other factors, or may receive a pre-ordered ranking of candidate advertisements from a cache server. Embodiments of the disclosure may generate and/or access cached user information that reduces a number of calculations or other evaluations that an ad server may do in response to a bid request. Costs related to real-time computing, such as computing power, may also be reduced in light of the potential for reduced real-time calculations.

Referring now to FIG. 1, an example dataflow 100 is illustrated with a mobile device 110 and a user 112, a website/ad publisher server 120, an ad exchange server 200, an ad server 300, and a cache server 400 in communication via one or more network(s) 130. Although FIG. 1 includes the illustrated components, other embodiments may include additional or fewer components. The user 112 may be associated with user attributes, which may be provided by the respective user and/or determined via user interaction. User attributes may include demographic information, geographic information, electronic and/or physical addresses, and other information. The ad exchange server 200 may be in communication with the one or more website/ad publisher servers 120. The ad server 300 may be one ad server in a fleet of multiple ad servers. The website/ad publisher server 120 may generate digital content 114 for presentation to the user 112 on a display of the mobile device 110. The digital content 114 may include an available advertising slot ("ad slot") 116 indicating an ad slot in which an ad impression may be served to the user 112. The website/ad publisher server 120 may send an available ad slot notification with information related to the available ad slot 116 to the ad exchange server 200. The ad exchange server 200 may receive the available ad slot notification at operation 132 and may generate a bid request for the available ad slot 118 at operation 134. The ad exchange server 200 may allot a bid response time 136 of about 100 milliseconds for entities to respond to the bid request. The bid request may include the available ad slot information received from the website/ad publisher 120, which may include a user identifier that identifies user 112, a device identifier that identifies mobile device 110, contextual information such as geographic region and/or chronological information, information related to the content 114, and/or other information. The ad exchange server 200 may send the bid request to connected entities, such that the connected entities may submit a bid in connection with an ad impression to serve at the available ad slot 116.

The ad server 300 may receive the bid request from the ad server 200 at operation 138. The ad server 300 may be one server in a fleet of ad servers. Serving ad impressions across the fleet of ad servers may be managed by generating scores for various ads available in an advertising inventory in response to each bid request processed by a particular server in the fleet. Generating scores for various ads may maximize a global performance objective across all ad impressions being served by the fleet of ad servers by tracking ad metrics such as ad impressions delivered for a particular ad campaign, rate of ad impression delivery, click-through rates or other performance metrics, and the like. In order to generate scores for individual ads across the fleet of ad servers, one or more of the ad servers may evaluate probabilistic models on large feature sets represented in a bid request, such as user attributes for the user visiting a given web page or other digital content (e.g., behavioral, demographic, and/or geographical features), as well as contextual features. Depending on the size of the feature sets to be evaluated, latency in ad serving due to response times to bid requests may result in suboptimal ad impression delivery due to incomplete analysis of available ads. However, not all feature sets vary or are otherwise dynamic at the same frequencies, and in particular, user feature sets may remain relatively stable over long periods of time. By caching computations related to user features, individual ad servers of the disclosure may have increased time to evaluate model scores over smaller feature sets with lower latency and higher throughput, resulting in more complete analysis of ads and improved effectiveness of delivered ad impressions.

Upon receiving the bid request from the ad exchange server 200, the ad server 300 may extract certain information, such as the user identifier, from the bid request, or may otherwise identify the user for which the ad slot 116 is available at operation 140. The ad server 300 may request cached user information for the identified user (e.g., user 112 in the illustration of FIG. 1), at operation 142 from the cache server 400 by sending a cached user information request to the cache server 400.

The cache server 400 may actively be caching user information for users associated with any one of the components illustrated in FIG. 1, among others. For example, the cache server 400 may determine candidate ads for users based at least in part on user attributes at operation 144. The cache server 400 may be a server in some embodiments, and in other embodiments may be a high speed datastore or other high speed data storage device configured to store cached information. The caching of user information by the cache server 400 may be ongoing, such as periodic recalculations or recalculations upon receiving a notification of updated user information (e.g., upon a new purchase by a user). The cache server 400 may have access to, or be in communication with a database, an available advertising inventory including ads that the ad server 300 may generate bids for. Each of the ads in the advertising inventory may have targeting criteria for a target consumer that the advertiser may have identified as being a consumer that the advertiser desires to serve ad impressions to. The cache server 400 may analyze the advertising inventory and respective targeting criteria, and may generate candidate ads for each user indicating ads for which the user meets the targeting criteria. For example, if a user is a 30 year old male, the cache server 400 may generate a set of candidate ads where the targeting criteria includes 30 year old males, and may not include ads with targeting criteria for females. In some embodiments, the cache server 400 may further rank the identified candidate ads for users to generate a pre-ordered ranking of candidate ads for individual users at operation 146 based at least in part on the targeting criteria for each individual ad, where the pre-ordered ranking sorts candidate ads by a match between the targeting criteria and the user. The cache server 400 may identify and/or determine candidate ads for users periodically and/or upon trigger events, such as when a user purchases an item. The cache server 400 may receive pushed updates for available advertising inventory and ad metrics, which may be used in ranking ads. For example, if a certain advertisement has not been served a sufficient number of times, the cache serer 400 may rank that advertisement higher for users such that the advertisement is presented more often.

In some embodiments, the cache server 400 may further determine a ranking score, such as a probability of conversion or a probability of action for specific users and in some cases, for specific users for specific ads. In other embodiments, another component, such as the ad server 300, may determine the probability of conversion. Probability of conversion or probability of action may be the probability that serving one impression of an ad for a given bid request or user will lead to a conversion or a click or other desired action. Probabilities may be determined, for example, by logistic regressions, redundancy models, or other models. The models used to determine probability may consider several inputs, including user-specific information (e.g., demographic, purchase history, etc.), context information (e.g., time of day, website content, keywords, etc.). Embodiments described herein may dynamically weight inputs of a probability model based on factors other than user-specific features. For example, a previous determination that a user is in the market to purchase electronics may not change hourly, and therefore, some probability models implemented by servers described herein may cache pre-calculated user information or analysis of user information, such that an ad server does not have to calculate user-specific information or make related determinations in real-time in response to a bid request. Ad servers described herein may therefore analyze a greater portion of, or all of, available advertising inventory during the time allotted to submit a bid, resulting in more thorough analysis and optimized bid generation and/or ad selection. Further, by reducing real-time calculations in response to bid requests, probability models or learners that may otherwise be impractical to implement may be utilized with certain embodiments described herein. While discussed within the context of caching user-specific information, additional information may be pre-computed and cached for access in real-time in response to a bid request, such as ad-specific information, ad campaign-specific information, coupon-specific information, and the like. In one example, a probability model may include a single number or numerical value representative of a particular user, and in some cases, a single numerical value for a user for a specific advertisement. The cache server 400 may generate the single number and may send the number to the ad server 300 upon request.

The ad server 300 may use the single number as a weighting factor of user-specific features in the probability model.

The cache server 400 may receive the request for cache user information for the user 112, and in response, the cache server 400 may send cached user information for the user 112 to the ad server 300 at operation 148. The ad server 300 may function to determine not only which ads are eligible for a particular bid request, based on the qualities of the bid request in general, one of which is user identity, but also to select one of the eligible ads to serve based on a number of different factors, where probability of conversion or action is one of the factors.

The ad server 300 may receive the cached user information from the cache server 400, and at operation 150 the ad server 300 may rank the candidate ads associated with the user, based at least in part on the cached user information. In some embodiments, the ad server 300 may receive a pre-ordered set of candidate ads with the cached user information, while in other embodiments the ad server 300 may receive only the set of candidate ads as identified by the cache server 300. In either embodiment, the ad server 300 may rank or re-rank the candidate ads, for example based on the available ad slot information (e.g., the geographic region of the user 112). In other embodiments, the ad server 300 may identify the top ranked candidate ad based on the pre-ordered ranking received from the cache server 400. The ad server 300 may use the pre-cached user information in combination with the ad slot information, such as source, time of day, geographic region, and the like to first eliminate candidate ads from consideration and then combine the ad slot-specific information with the cached user-specific information to determine the ad ranking. The ad ranking may be based on the estimation of probability and a number of other factors. Cached information may include, among other things, a set of ads for which a user is eligible based on the targeting criteria of the respective ad, and for each eligible ad, some amount of data that then could be combined with the bid request information to yield the final ad ranking.

At operation 152, the ad server 300 may generate an expected value for one or more of the candidate ads. The expected value may be used in ranking the candidate ads in some embodiments. Upon ranking the candidate ads and selecting one of the candidate ads for which to generate a bid, the ad server 300 may generate a bid amount. In generating a bid amount, information associated with a determined quality or value of the advertising slots, and/or information relating to metrics or historical data associated with advertisements that have previously been served (e.g., click-through rate, number of clicks, number of impressions, number of page views, number of associated searches, etc.) may be considered. Additional considerations in generating bid amounts may include bid data such as previous and/or most recent winning bid amounts for particular advertisements or for advertisements in a collection of advertisements available to be served, and/or a period of time that has elapsed since the most recent winning bid amount. Historical bid information may further include aggregate bid information relating to each bid amount previously submitted for an advertisement regardless of whether the bid amount was a winning bid amount or not. The historical bid information may additionally, or alternatively, include information that identifies the number of winning bids (e.g., number of impressions served for an advertisement) and a time period over which the impressions were served.

The ad server 300 may generate a bid with a bid amount in response to the bid request at operation 154 based at least in part on the expected value of the candidate ad. The expected value may be representative of a dollar amount that may be received as a result of serving one ad impression to the user 112. The ad server 300 may send the bid with the bid amount to the ad server 200 in response to the bid request. Because the ad server 300 did not individually evaluate the user attributes of the user 112, and instead received the cached user information from the cache server 400, the ad server 300 may have generated expected values for more candidate ads than if the ad server 300 had individually considered and/or evaluated a large feature set, such as individual user attributes.

The ad exchange server 200 may receive bids from connected entities in response to the bid request at operation 156, and may determine a winning bid. In some instances, the ad exchange server 200 may determine a winning bid upon completion of the bid response time 136. The advertisement associated with the winning bid, and in some instances the winning bid amount, may be sent from the ad exchange server 200 to the website/ad publisher 120 for presentation at the available ad slot 116. As shown in FIG. 1, a winning ad 158 may be served to the user 112 as part of the digital content 114. The ad server 300 may determine or otherwise track a conversion event of the winning ad 158 presented to the user 112, which may be indicated by a user interaction with the ad, such as a click-through by the user for the ad. Other examples of user interactions that may be considered conversion events include viewing digital content such as an ad impression for a threshold length of time (e.g., 10 seconds), watching all or a majority of a video, subsequent searching for or viewing of products associated with an ad impression, and the like. For example, if a user is presented with an ad impression for a particular brand of clothing, and instead of clicking on the ad impression, the user searches for or otherwise views products associated with the particular brand of clothing, the ad server 300 may track this as a conversion event for the ad impression. The user interaction may be counted as a conversion event if the user takes a specific action within a threshold length of time, such as within 5 minutes of being served an ad impression. In some embodiments, the ad server 300 may send a user information update event notification to the cache server 400 indicating that the user information associated with the user is to be updated based at least in part on the conversion event for serving the winning ad 158. The cached server 400 may adjust one or more candidate ad rankings or identify additional or different candidate ads based at least in part on the conversion event.

Dynamically adjusting bid amounts based on these various types of information, such as expected value or probability of conversion, may facilitate generating bid amounts for advertisements that may provide the highest expected value as determined by the systems and methods described herein. Additionally, the quality or value of a particular advertising slot may be considered in ranking candidate ads or generating bids, and may allow for the delivery of ad impressions to more closely match an advertiser's desired target consumer or audience.

Advertisement metrics may also be considered in determining bid amounts. Advertising metrics may include data relating to a number of ad impressions previously served, a time period over which the ad impressions were served, an associated click-through rate, a number of clicks generated, a number of page views of web sites of advertisers generated based on ad impressions, a number of searches conducted as a result of ad impressions, a number of purchases made of advertised products or services, a purchase rate, a consideration rate, and so forth. The ad metrics may further include demographic information relating to users exposed to ad impressions. Advertisements may include price floors or price ceilings set by an advertiser indicative of a minimum or maximum static bid amount for a single impression. Ad metrics, price ceilings and floors, or criteria of an available ad slot may be factors in determining a bid amount. Other information may be considered in generating bid amounts.

By pre-calculating and/or caching user information using the cache server 400, a response time to bid requests may be reduced or may allow systems of the disclosure to process additional metrics in selecting an advertisement to present because an individual analysis of user attributes can be bypassed. For example, if a bid must be submitted within 100 milliseconds of receiving a bid request, systems of the disclosure may be able to obtain cached user information, which may include pre-ordered candidate advertisements. Systems of the disclosure may therefore have additional time in which to determine which of the candidate advertisements may have the highest expected value, and to generate a bid amount for an advertisement selected from the subset of candidate advertisements. Because the selection of an advertisement may include evaluation of factors such as ad-specific features, knowledge of user context (e.g., time of day, keywords on the webpage), and user features, embodiments of the disclosure may provide improved evaluation of candidate advertisements, in part, by removing non-relevant advertisements from consideration and pre-calculating or analyzing user features.

Certain embodiments of the systems and methods described herein may reduce ad serving latency and increase throughput, resulting in lower costs related to ad serving. The real-time evaluation of probabilistic models (e.g., for click prediction) may be efficiently distributed across components of an ad serving system, so as to reduce model evaluation time and latency. Example embodiments of the disclosure relate to systems, methods, computer-readable media, techniques, and methodologies for real-time probabilistic model evaluation for online advertising by caching relatively static features to consider in responding to bid requests, such as user attributes or preferences.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Case

Figure 2:
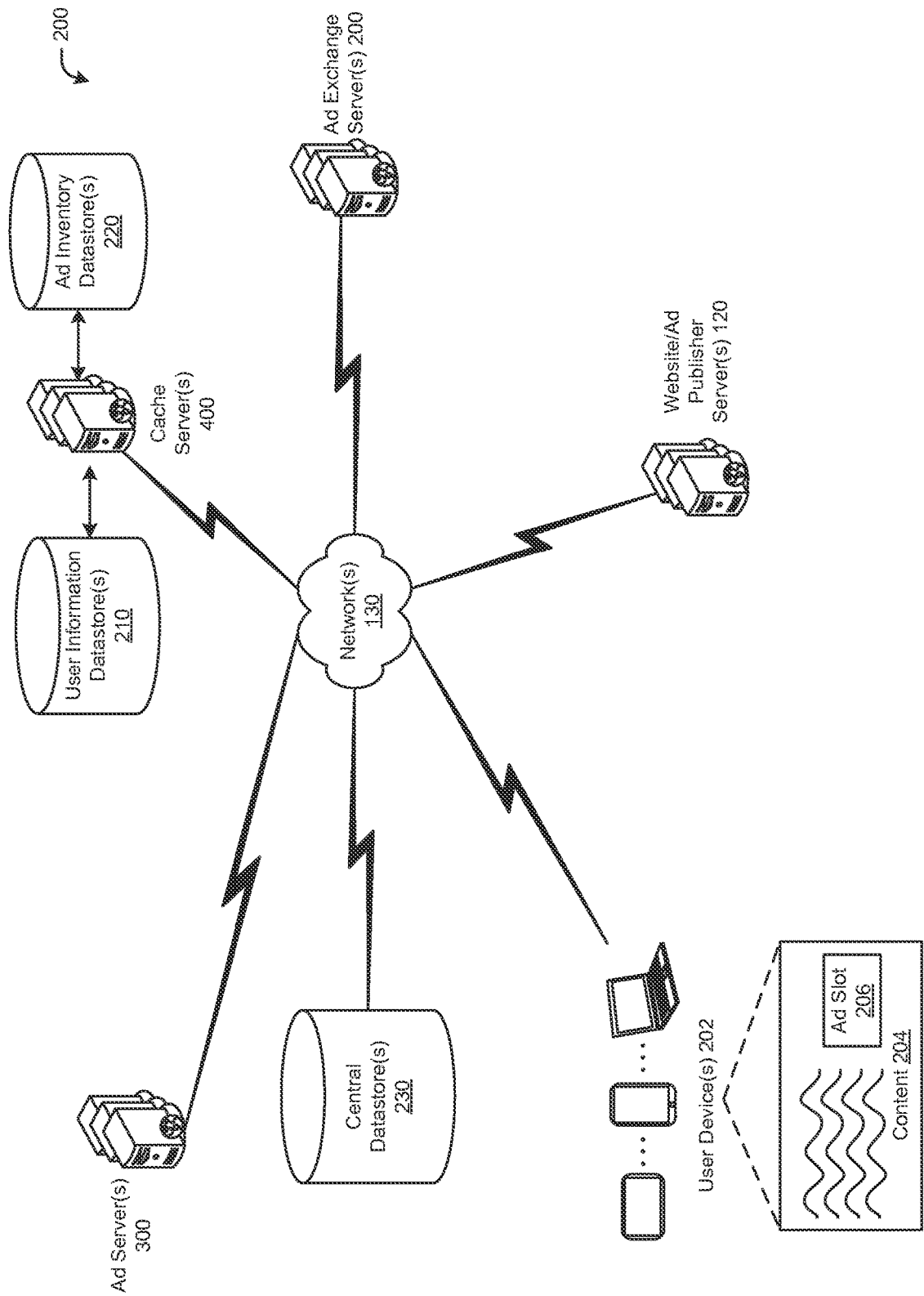
FIG. 2 schematically illustrates components of an example system in communication over a network in accordance with one or more example embodiments of the disclosure.
Figure 3:
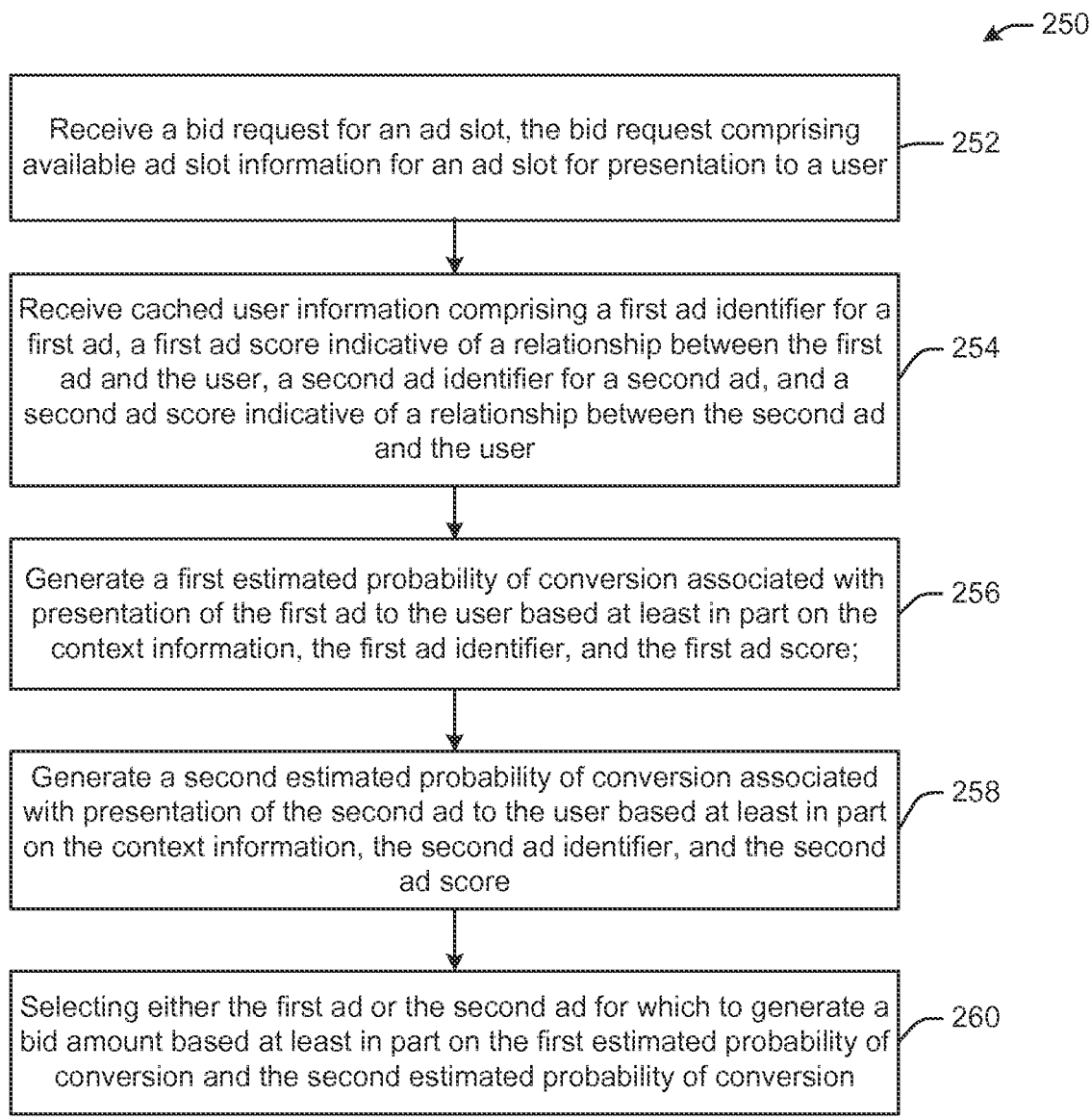
FIG. 3 is an example process flow in accordance with one or more embodiments of the disclosure.
Figure 4:
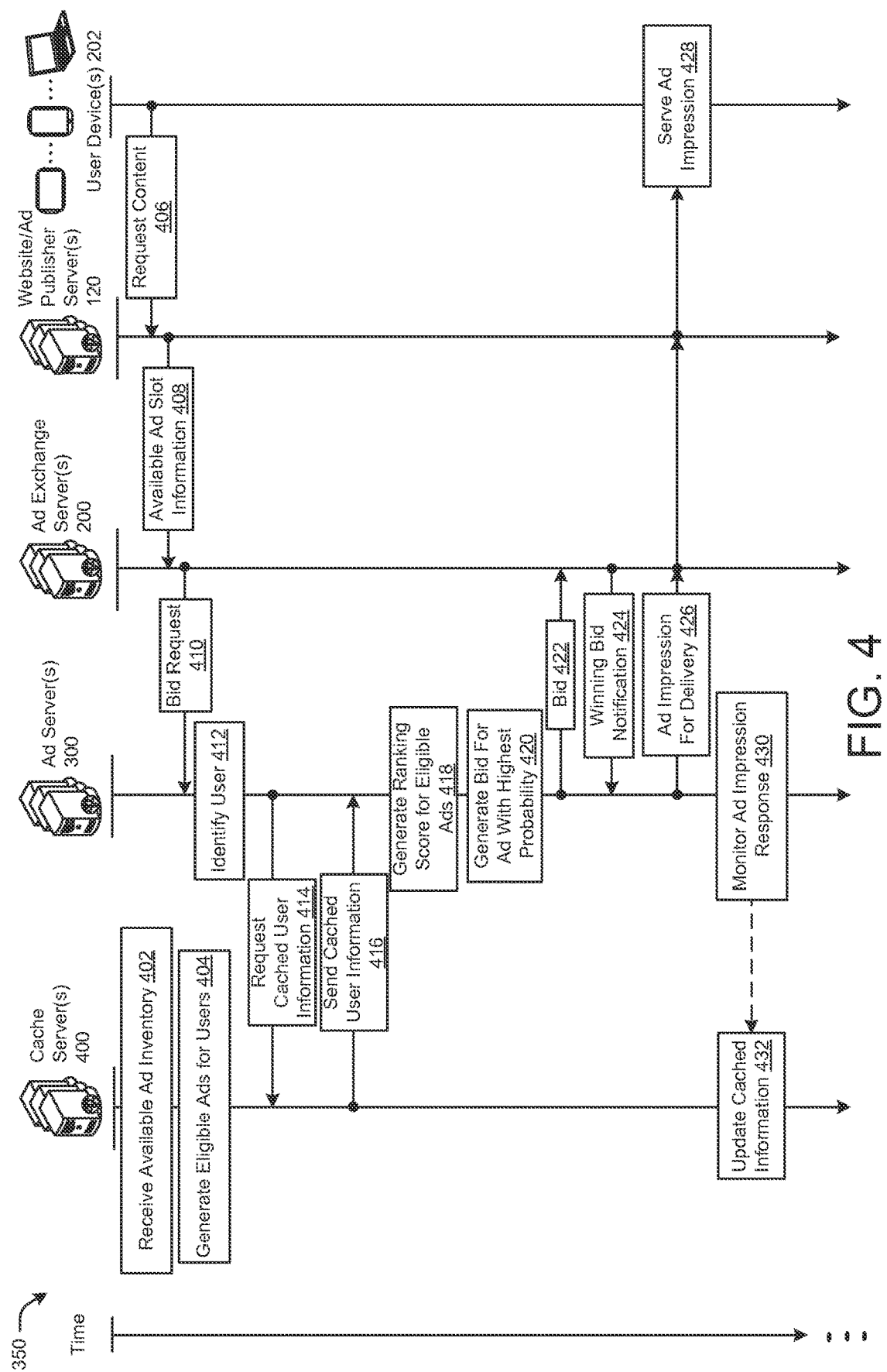
FIG. 4 is an illustrative data flow over time between components of a system and related operations in accordance with one or more example embodiments of the disclosure.

Referring to FIGS. 2-4, FIG. 2 illustrates an example system architecture 200 with components in communication over a network. An example process flow 250 is depicted in FIG. 3 and will be discussed in conjunction with the schematic illustration of FIG. 4. FIG. 4 illustrates an example dataflow 350 among the components of the system architecture 200 of FIG. 2. Although certain operations are illustrated as occurring separately in FIGS. 3 and 4 for clarity, some or all of the operations may occur concurrently or partially concurrently. Other embodiments may include additional or fewer, or different, components than those illustrated in FIGS. 2 and 4.

Referring first to FIG. 2, the illustrated system architecture 200 includes a user device 202, the website/ad publisher server 120, the ad exchange server 200, the ad server 300, and the cache server 400. Each component may be in wireless or wired communication via the network 130. The illustrated components may be the same or different than the components discussed with respect to FIG. 1. The ad server 300 may include one or more memory devices and one or more computer processors with computer-executable instructions configured to implement process flow 250. In other embodiments, the cache server 400, or another device may implement process flow 250. The user device 202 may present digital content 204 to a user with an available ad slot 206. The cache server 400 may be in communication with one or more user information datastore(s) 210 that store user information, such as user attributes, preferences, advertising history, and the like. The cache server 400 may be in communication with one or more ad inventory datastore(s) 220 that may store available advertising inventory, or ads that are available for the ad server 300 to serve or submit bids for. The system architecture 200 may include one or more central datastore(s) 230 for backup purposes or for remote access by one or more of the system components. While illustrated as separate components, the illustrated datastores may be combined into a single datastore or may be separated into multiple datastores. The illustrated datastores may include one or more memory devices and may be configured for high speed data storing and retrieval.

In order to serve ad impressions in an online context, parties may be subject to a bidding process for an available ad slot, in which the ad impression of the winning bidder will be served. Before an ad impression is served to a potential consumer, an entity, such as an ad exchange system, may send a bid request for an advertisement to display in connection with an available advertising slot. The bid request may include information related to the specific available ad slot, such as information related to the user to which the ad impression will be served (e.g., a user of the user device 202 in FIG. 2), website content or context, location information, chronological information, and other related information. The ad exchange system may include one or more ad exchange servers that facilitate bidding on advertising inventory. A collection of advertising inventory may be received by the ad exchange system from various website publishers, search engines, or other advertising publishers. More specifically, the advertising inventory, or information indicative thereof, may be received by the ad exchange system from website publisher computers, search engine computers, or other advertising publisher computers that server one or more web pages with which an advertising slot is associated.

In FIG. 4, the cache server 400 may receive available ad inventory at operation 402. The available ad inventory may be a set of one or more advertisements associated with ad campaigns for which the ad server 300 may serve ad impressions. The available ad inventory may include a set of ads from which ads can be selected for presentation to users. The cache server 400 may further have stored locally, or otherwise have access to, users for which pre-calculated information may be generated and cached by the cache server 400. The cache server 400 may pre-calculate user information such that the pre-calculated user information may be sent to a requesting server upon request. For some or all users the cache server 400 pre-calculates user information for, the cache server 400 may identify ads the user is eligible for, an ad serving history for the user, and/or eligible ad scores for the user. The cache server 400 may, in one example, request the user attributes from the user information datastore 210. The cache server 400 may have access to available ad inventory, for example via request from the ad inventory datastore 220. The cache server may further identify targeting criteria for each of the ads in the available ad inventory. The cache server 400 may identify one or more eligible ads for respective users by considering the targeting criteria for each of the available ads and comparing or otherwise matching or analyzing against the user attributes. The cache server 400 may analyze the ad serving history for respective users to determine which ads were recently or ever served to the user, and may include conversion events, such as click through. The cache server 400 may determine eligible ad scores for the eligible ads that indicates the level of match between the user and the targeting criteria for the specific ad. The ad scores may further be used to pre-order the eligible ads, which may result in additional time savings in response to bid requests for a particular user. Ad scores may be numerical values generated based at least in part on behavioral information of the user, geographic information of the user, and demographic information of the user.

The website/ad publisher server 120 may be in communication with the user device 202 and may server digital content for presentation on a display of the user device 202. The website/ad publisher server 120 may receive a request for content at operation 406 from the user device 202. The website/ad publisher server 120 may determine that an ad slot is available for presentation of an ad impression to the user viewing digital content on the user device 202. The website/ad publisher server 120 may request an advertisement for the available ad slot from the ad exchange server 200. In requesting an advertisement, the website/ad publisher server 120 may send available ad slot information to the ad exchange server 200 at operation 408. The available ad slot information may include, as described herein, context information, user information (e.g., demographic information, online user behavior information, etc.) associated with a user who may view an ad impression served in that ad slot, user device information (e.g., information related to user device 202), information identifying various attributes of the ad slot, contextual information, content information, chronological information, and other information.

The ad exchange server 200 may receive the request for the advertisement from the website/ad publisher server 120 and may generate a bid request. The bid request may include the available ad slot information and other context information. The ad exchange server 200 may send a bid request to connected ad servers. The ad exchange server 200 may be associated with any one or more advertising exchanges or ad servers that provide a mechanism for the submission of bid amounts for advertising slots. The advertising exchange(s) may be interconnected in any suitable manner. The ad server 400 may be associated with a single bidding entity or one or more related bidding entities. In certain embodiments, other ad servers (not shown) may interact with the ad exchange server and may be associated with various competing bidding entities. In FIG. 4, the ad exchange server 200 may send the bid request to the ad server 300 at operation 410. In other embodiments, the bid request may be sent to another one of the ad servers in a fleet of ad servers that includes the ad server 300.

In response to receiving a bid request, entities may generate bids. The bidding process for an available advertising slot may occur in real-time as bid requests for available advertising slots are received. In one or more representative scenarios, the entire time from transmission of the bid request from the ad exchange system to a bidding entity and receipt of a bid amount from the bidding entity by the ad exchange system may span approximately 100 milliseconds.

Referring to FIG. 3, the illustrated process flow 250 for optimizing real-time probabilistic model evaluation for online advertising includes, at block 252, receiving a bid request for an ad slot, the bid request comprising available ad slot information for an ad slot for presentation to a user. The available ad slot information may include context information representing context for the available ad slot and a user identifier associated with the user. As illustrated in FIG. 4, the ad server 300 may receive a bid request from the ad exchange server 200 at operation 410. The bid request may include context information, a user identifier indicative of a user for which the ad slot is available, and other information, including the available ad slot information.

Upon receiving the bid request, the ad server 300 may extract the context information and/or the user identifier from the available ad slot information or the bid request to generate extracted information. The extracted information may facilitate identification of the user for which the ad slot is available, or the user operating user device 202. The extracted information, for example, may include a unique user identifier. In FIG. 4, the ad server 300 may identify the user at operation 412, based at least in part on the bid request and/or the available ad slot information.

The ad server 300 may send a cached user information request to a remote server, such as the cache server 400. The cached user information request may include a request for user information of the user. In the example of FIG. 4, the ad server 300 may send the cache server 400 a request for cached user information at operation 414.

The cache server 400 may receive the request for cached user information, and in response, may identify pre-calculated cached user information associated with the particular user for which user information is being requested. At operation 416, the cache server 400 may send the cached user information to the ad server 300. During the time in between operation 414 and operation 416, the ad server 300 may evaluate non-user-specific aspects of the available ad slot, such as context, targeting criteria for various advertisements, and the like.

The cached user information sent to the ad server 300 from the cache server 400 may include, as discussed herein, various pre-calculated information that may facilitate selecting an advertisement for which to generate a bid and/or generating bids in response to bid requests. The cached user information may include a set of eligible ads selected from the set of candidate ads or available advertising inventory that are pre-matched or otherwise identified as being potentially servable to a particular user. For example, targeting criteria may include a male living on the west coast between the ages of 18-24. The cache server 400 may sort through available user information and pre-match users that fit the targeting criteria as potential recipients of the ad. In some embodiments, the cache server 400 may generate a set of one or more eligible ads that may be sent to the ad server 300 upon request for user information associated with a particular user. In the example of FIG. 4, the set of eligible ads may for the user of user device 202 may include a first ad and a second ad, where the set of eligible ads is indicative of ads with targeting criteria for which the user meets a threshold level of the targeting criteria. The threshold level may be represented by meeting some, a majority of, substantially all of, or all targeting criteria, such as over half of Boolean true/false queries, or by another metric. Additional examples of thresholds may include a relative comparison of target criteria matching amongst available users. For instance, while no users meet each targeting criteria, a user that meets most targeting criteria relative to other users may meet the threshold.

In some embodiments, the cached user information may include a pre-ordered ranking of eligible ads for a user. The pre-ordered ranking may be based at least in part on respective ad scores for the eligible ads, historical data indicative of a presentation history of respective ads, such that a user is not repeatedly presented with the same ad impression, or other factors, such as ad campaign performance information. In one example of ad campaign performance information, an ad may be ranked higher than normal if the ad is behind a desired rate of ad impression delivery.

Referring to FIG. 3, block 254 of the process flow 250 includes receiving cached user information comprising a first ad identifier for the first eligible ad, a first ad score indicative of a correlation, dependence, or relationship between the first ad and the user, a second ad identifier for a second ad, and a second ad score indicative of a correlation, dependence, or relationship between the second ad and the user. In FIG. 4, in response to the cached user information request, the ad server 300 may receive cached user information from the cache server 300. The cached user information may include ad identifiers for one or more eligible ads for which the user is eligible, as determined at least in part by targeting criteria for individual ads or ad campaigns generally. The ad identifiers may include links to ads, alphanumeric identifiers, or other identifiers. The cached user information may include ad scores for some or all of the eligible ads, where the ad score may represent a level of match between the targeting criteria for an ad and the user. In FIG. 4, the ad server 300 may receive a first eligible ad identifier for a first eligible ad, a first ad score indicative of a correlation, dependence, or relationship between the first eligible ad and the user of the user device 202, a second eligible ad identifier for a second eligible ad, and a second ad score indicative of a correlation, dependence, or relationship between the second eligible ad and the user of the user device 202. The eligible ads may be selected from the available advertising inventory.

Upon receiving the cached user information, or upon receiving the bid request 410, the ad slot information may be analyzed by the ad server 300 based at least in part on one or more quality metrics and/or optimization criteria. The ad server 300 may generate a quality score based at least in part on the analysis of the ad slot information. The quality score may provide a quantitative measure of a potential impact on the online behavior of a user who would view the advertisement if presented in the ad slot. The determined quality may represent a potential impact that an advertisement impression served in the advertising slot will have on online behavior of user(s) exposed to the advertisement impression. The quality metrics may be determined, for example, based on advertising traffic data relating to previously delivered ad impressions. The advertising traffic data may relate to any number of ad impressions including ad impressions for advertisements not forming part of the pool of advertisements, and which may have been delivered by other entities. More specifically, the quality metrics may relate to ad traffic data relating to any ad campaigns, including campaigns that may include advertisements not within the pool of advertisements available for delivery. The quality metrics may, for example, relate to any number of ad performance metrics such as a click-through rate, a number of clicks, a number of page views of advertiser websites, a number of related searches, and so forth.

A quantitative indicator indicating a result of the assessment of the ad slot information with respect to the quality metrics may be generated by the ad server 300. The quantitative indicator may be further reflective of an analysis of the ad slot information with respect to any relevant optimization criteria. Alternatively, the analysis with respect to the optimization criteria may not be reflected in the quantitative indicator, but may optionally be used in the ranking process or in generating a bid amount. The quantitative indicator may, in effect, represent a type of quality score that provides a quantitative measure of a potential impact on the online behavior of user(s) that may result from viewing a candidate advertisement displayed in the advertising slot. The ad server 300 may compare the generated quality score against some predetermined threshold to determine a ranking of candidate ads or to generate a bid amount in response to the bid request for the available advertising slot.

The ad server 300 may also utilize other information to rank candidate ads in connection with an advertising slot. For example, the ad server 300 may analyze the advertising slot information associated with a particular available advertising slot in relation to one or more delivery constraints associated with candidate advertisements. Advertisers may implement delivery constraints to minimize regret, or to avoid serving ad impressions to consumers that have a relatively low probability of conversion or ranking score, or will likely not take action based on the ad. Regret may occur in online advertisements because once an ad impression is served, the bid amount is consumed and the ad impression may not be "unserved." The delivery constraints may include, without limitation, a geographical region within which the one or more candidate advertisements must be viewed, one or more characteristics associated with user segments to whom the one or more candidate advertisements are targeted (e.g., demographic characteristics, online behavior characteristics, etc.), and so forth. Those candidate advertisements having associated delivery constraints that are not met by the advertising slot (which may be determined based on the received ad slot information) may be discarded from the ranking process.

Upon analyzing the ad slot information and the cached user information, or generally after receiving the bid request 410, the ad server 300 may generate a ranking of each candidate advertisement, or in some embodiments, a ranking of eligible advertisements. Ranking may be determined by a ranking score based at least in part on the goals of the ad campaign associated with the candidate ad, the cached user information, delivery constraints, ad slot information, total budget consumption, and other factors. In some embodiments, bid amounts may be based at least in part on ranking scores. In one example, a ranking score may be determined based at least in part on a dollar value (e.g., base cost for dollar impressions), a probability of conversion or action, and an ad impression delivery rate for an ad campaign.

Block 256 of the process flow 250 in FIG. 3 includes generating a first estimated ranking score, which may be a probability of conversion associated with presentation of the first ad to the user based at least in part on the context information, the first ad identifier, and the first ad score. Block 258 of the process flow 250 in FIG. 3 includes generating a second estimated ranking score, which may be a probability of conversion associated with presentation of the second ad to the user based at least in part on the context information, the second ad identifier, and the second ad score.

In FIG. 4, at operation 418, the ad server 300 may generate estimated probability(ies) of conversion for one or more eligible ads based at least in part on the presentation of the respective eligible ad to the user of the user device 202. The ranking score may be a probability of conversion may be based at least in part on the context information, the eligible ad identifiers, and the ad scores. The generated ranking scores may be indicative of a likelihood the user will react to the first eligible ad in a manner desired by the advertiser (e.g., click, watch, etc.).

Block 260 of the process flow 250 in FIG. 3 includes selecting either the first ad or the second ad for which to generate a bid amount based at least in part on the first estimated ranking score and the second estimated ranking score. In FIG. 4, the ad server 300 may select the ad with the highest ranking score, or in some embodiments, the highest probability of conversion, for which to generate a bid. In some instances, the ad server 300 may not select the ad with the highest probability of conversion and may instead pick another ad for which to generate a bid. One example is if the user to which the ad will be served has recently been served the ad, or if the user previously did not react to the ad upon being served. Other overrides or overriding factors may result in the ad server 300 generating a bid for an ad that does not have the highest probability, such as the ad having the second greatest probability. In some embodiments, the ad server 300 may select an ad for which to generate a bid by determining which ad has the greatest estimated probability of conversion is greater than the second estimated probability of conversion.

Upon determining a ranking of eligible ads by ad server 300, a bid amount may be generated for the top ranked candidate ad. In some embodiments, the ad server 300 may generate a bid for the top ranked pre-ordered eligible ad, if the cached user information includes a ranking of eligible ads. As shown in FIG. 4, the ad server 300 may generate a bid amount for the selected ad and may send or submit the bid to the ad exchange server 200 in response to the bid request 410 at operation 422. The bid amount generated by the ad server 300 for the selected ad may be based at least in part on the estimated ranking score or probability of conversion for the ad. In some instances, the bid amount may be equal to, or substantially equal to, the ranking score numerical value or probability of conversion for the ad. In generating the bid amount, information associated with a determined quality or value of the advertising slots, and/or information relating to metrics or historical data associated with advertisements that have previously been served (e.g., click-through rate, number of clicks, number of impressions, number of page views, number of associated searches, etc.) may be considered. Additional considerations in generating bid amounts may include bid data such as previous and/or most recent winning bid amounts for particular advertisements or for advertisements in a collection of advertisements available to be served, and/or a period of time that has elapsed since the most recent winning bid amount. Historical bid information may further include aggregate bid information relating to each bid amount previously submitted for an advertisement regardless of whether the bid amount was a winning bid amount or not. The historical bid information may additionally, or alternatively, include information that identifies the number of winning bids (e.g., number of impressions served for an advertisement) and a time period over which the impressions were served.

Advertisement metrics may also be considered in determining bid amounts. Advertising metrics may include data relating to a number of ad impressions previously served, a time period over which the ad impressions were served, an associated click-through rate, a number of clicks generated, a number of page views of web sites of advertisers generated based on ad impressions, a number of searches conducted as a result of ad impressions, a number of purchases made of advertised products or services, a purchase rate, a consideration rate, and so forth. The ad metrics may further include demographic information relating to users exposed to ad impressions. Advertisements may include price floors or price ceilings set by an advertiser indicative of a minimum or maximum static bid amount for a single impression. Ad metrics, price ceilings and floors, or criteria of an available ad slot may be factors in determining a bid amount. Other information may be considered in generating bid amounts.

Dynamically adjusting bid amounts based on expected value, and in some embodiments, probability scores representing likelihood of membership in a consumer segment, may facilitate generating bid amounts that increase or decrease a likelihood of winning a bidding process for an available ad slot, and by dynamically adjusting bids based at least in part on consumer segments, probability scores, and/or expected values, an impact of serving online ad impressions may be increased, resulting in improved effectiveness of an ad campaign. Impact on online behavior of users may be measured in accordance with any suitable advertising performance metric such as a click-through rate, a number of clicks, a number of page views, a number of searches, and so forth.

In FIG. 4, the ad exchange server 200 may receive the bid 422, and may determine that the bid amount 422 is the winning bid. In response, the ad exchange server 200 may send the ad server 300 a winning bid notification at operation 424. The ad server 300 may receive the winning bid notification 424 and may package data associated with the winning ad impression and send the ad impression and related data to the ad exchange server 200 at operation 426 for delivery to the website/ad publisher server 120 and/or requesting user device 202 for serving at the available ad slot. While illustrated as being sent to individual entities, the ad impression may be sent and/or delivered to the user device 202 in any number of ways. Further, upon delivery of the advertisement or subsequent thereto, the bid data and/or ad metrics may be updated to reflect the fact that the submitted bid amount was a winning bid amount and an ad impression was delivered. The user device 202 may receive the ad impression and may serve the ad impression at the available ad slot to the user at operation 428.

Upon serving the ad impression, the ad server 300 may monitor the ad impression response by the user at operation 430. Responses that may be monitored include using a tracking pixel to determine delivery and/or click-through conversion, and the like. Upon determining that a conversion event, which may be indicated by a click-through by the user for the served ad, the ad server 300 may send a user information update event notification to the cached user server 400 either immediately or periodically, or after a threshold number of monitored responses. The user information update event notification may indicate that the user information associated with the user is to be updated based at least in part on the conversion event. The cached server 400 may receive the monitored response notification and may update the cached user information at operation 432. The cached server 400 may determine an updated set of eligible ads, adjust a ranking of eligible ads, or perform other actions based on the updated or monitored responses. Other components of the system may monitor responses instead of, or in addition to, the ad server 300.

In some embodiments, at certain time intervals, which may be periodic or variable, or after certain events occur, the cache server 400 may send a request for updated ad inventory information or updated user information such that the cache server 400 may continuously generate updated cached user information.

Figure 5:
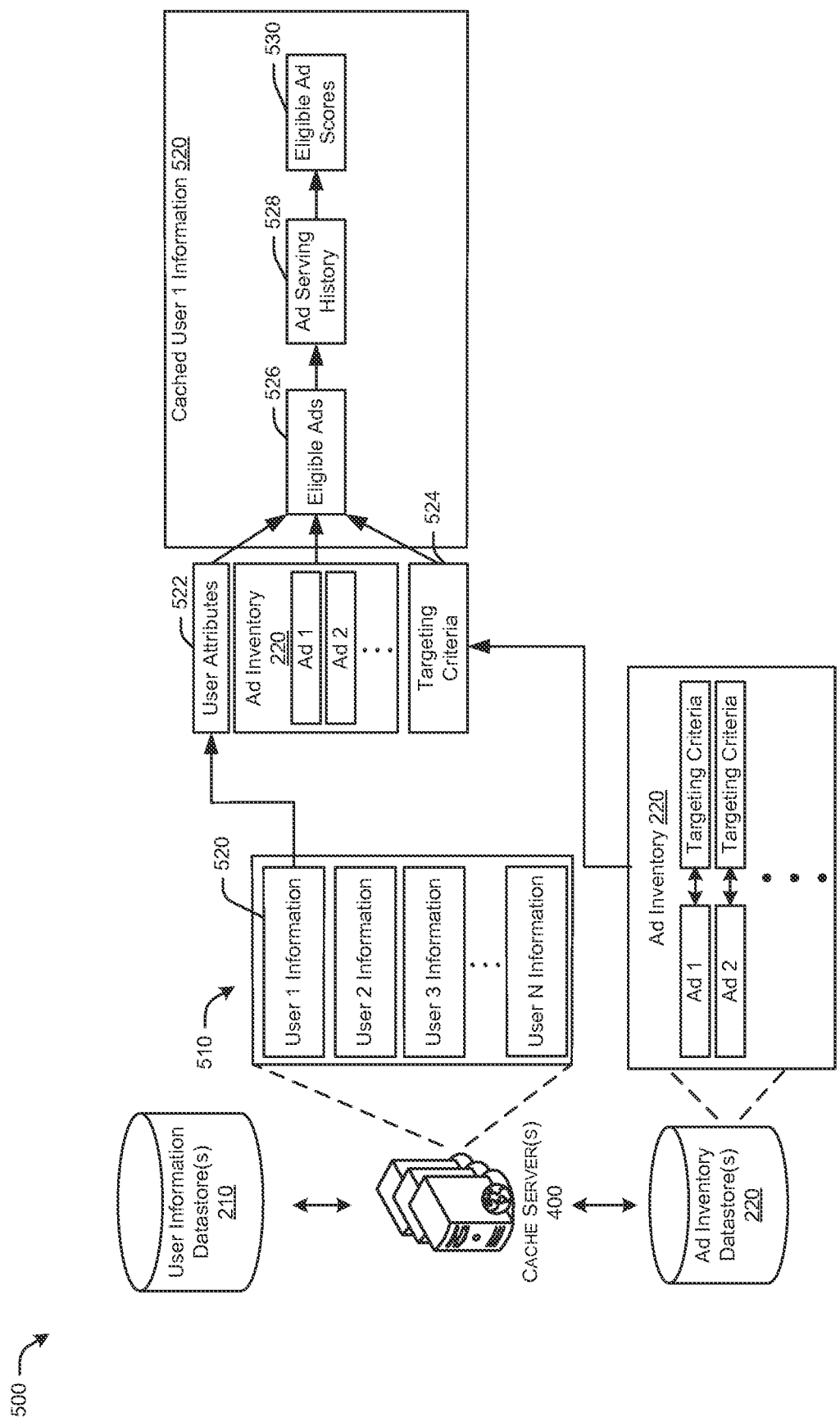
FIG. 5 schematically illustrates an example process flow for determining cached user information in accordance with one or more embodiments of the disclosure.

Referring now to FIG. 5, an example environment 500 is illustrated with the cache server 400 in communication with the user information datastore 210 and the ad inventory datastore 220. The cache server 400 may pre-calculate user information such that the pre-calculated user information may be sent to a requesting server upon request. In FIG. 5, the cache server 400 may include a set of pre-calculated user information for one or more respective users. The users may be identified by a user identifier. The cache server 400 may include, for example, user 1 information 520. For some or all users the cache server 400 pre-calculates user information for, the cache server 400 may identify ads the user is eligible for, an ad serving history for the user, and/or eligible ad scores for the user. For example, for the user 1 information 520, the cache server 400 may identify user attributes 522 for user 1. The cache server 400 may, in one example, request the user attributes 522 from the user information datastore 210. The cache server 400 may have access to available ad inventory, for example via request from the ad inventory datastore 220. The cache server may further identify targeting criteria 524 for each of the ads in the available ad inventory, for example via request from the ad inventory datastore 220. The cache server 400 may identify one or more eligible ads 526 for respective users by considering the targeting criteria 524 for each of the available ads 220 and comparing or otherwise matching or analyzing against the user attributes 522. The eligible ads 526 may be a reduced set of ads compared to the available ad inventory. The cache server 400 may analyze the ad serving history 528 for respective users to determine which ads were recently or ever served to the user, and may include conversion events, such as click through. The cache server 400 may determine eligible ad scores 530 for the eligible ads that indicates the level of match between the user and the targeting criteria for the specific ad. The ad scores may further be used to pre-order the eligible ads, which may result in additional time savings in response to bid requests for a particular user.

The methods and systems described herein may result in thorough evaluation of ads in response to bid requests, and may increase effectiveness of ad campaigns and also reducing costs associated with computing. In other embodiments of the disclosure, the ad server may generate ad scores or perform analysis performed by the cache server, and vice versa.

Illustrative Computer Architecture

Figure 6:
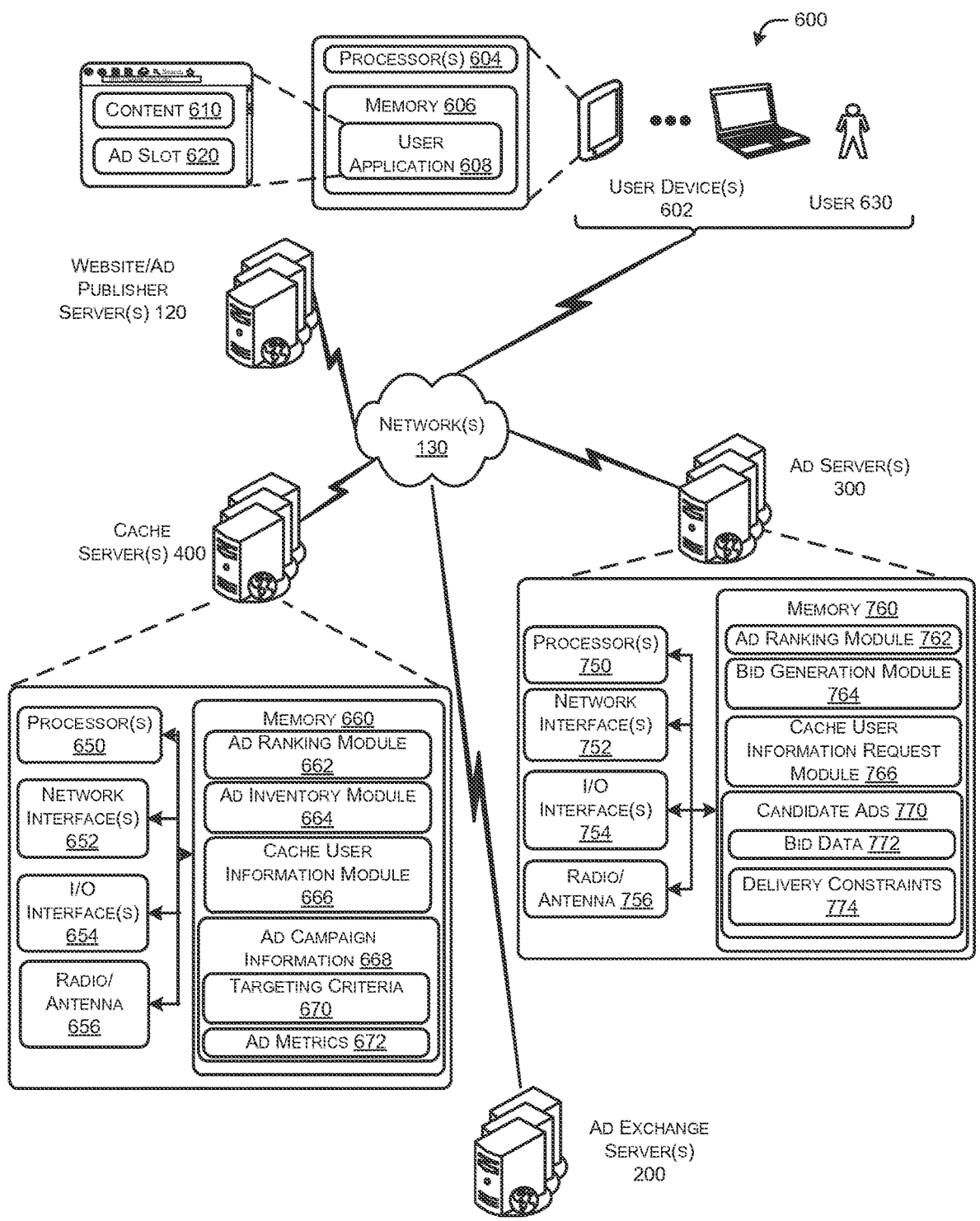
FIG. 6 schematically illustrates an example system architecture of a system in accordance with one or more embodiments of the disclosure.

Referring now to FIG. 6, an example computer network architecture 600 is depicted. FIG. 6 includes an example website/ad publisher server 120, an example ad exchange server 200, an example ad server 300, an example cache server 400, and an example user device 600 with a user 630. Each component may be connected via network 130.

The network(s) 130 may include, but are not limited to, any one or more different types of suitable communications networks, such as cable networks, the Internet, wireless networks, cellular networks, or other private and/or public networks. Further, the network(s) 130 may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

As illustrated, the user device 602 includes one or more processor(s) 604 and one or more memory devices 606 with a user application 608 stored thereon. The user device 602 may also include various additional components, such as one or more input device(s), I/O interface(s), radio/antennas, network interface(s), and other components. The user device 602 may also include an operating system configured to provide an interface between software and hardware resources of the user device 602, and/or database management systems configured to support functionality of the memory 606. The user device 602 may include system busses that functionally couple various components of the user device 602. In other embodiments, the user device 602 may include additional or fewer components.

The memory 606 may include one or more program modules, applications, or the like, such as the user application 608. One or more user applications 608 may be loaded into the memory 606. The user applications 608 may be any application(s) capable of facilitating the display of or otherwise presenting advertisement impressions to the user 630. The user applications 608 may include, but are not limited to, a web-based browser application, a dedicated software application (e.g., a smart phone application, a tablet application, etc.), a mobile browser application, and so forth. The user application 608 may be configured to render web pages on a respective user device. The web pages may include an advertisement presented in the available advertising slot 620 and other content 610 viewable by the user 630. Any data may be loaded into the memory 606 for use by the processor(s) 604 in executing computer-executable code. The user device 602 may be configured to access, store, and/or retrieve data in or from one or more datastore(s). The user device 602 may also include communications connection(s) that allow the user device 602 to communicate with datastores, other computing devices or servers, user terminals, and/or other devices via the network(s) 130.

The user device 602 may be any suitable user device including, but not limited to, a mobile device such as a smartphone, tablet, e-reader, or the like; a desktop computer; a laptop computer, a game console, a personal media player, a wearable computer device (e.g., eyewear, wristwatches, embedded devices, etc.), and so forth. The user device 602 may be configured to present or serve ad impressions to users 630. The user device 602 may be configured to operate in various operational modes and may be configured to present electronic content and ad impressions.

The cache server 400 includes one or more processor(s) 650, one or more network interface(s) 652, one or more input/output ("I/O") interface(s) 654, one or more radio/antenna(s) 656, and one or more memory devices 660. The cache server 400 may also include various additional components, such as one or more input device(s), configured to interact with the I/O interface 654, that allows user 630 to operate the cache server 400. The cache server 400 may also include an operating system configured to provide an interface between software and hardware resources of the cache server 400, and/or database management systems configured to support functionality of the memory 660. The cache server 400 may include system busses that functionally couple various components of the cache server 400. In other embodiments, the cache server 400 may include additional or fewer components.

The memory 660 may include one or more program modules, applications, or the like, such as an ad ranking module 662, an ad inventory module 664, and a cache user information module 666. Any of the modules may include one or more sub-modules. For example, the ad inventory module 664 may include a delivery constraint sub-module. Any of the modules depicted in FIG. 6 may include computer-executable code, instructions, or the like that may be loaded into the memory 660 for execution by one or more of the processor(s) 650. In some embodiments, the memory 660 may include ad campaign information 668, including targeting criteria 670 and ad metrics 672. In other embodiments, the ad campaign information 668 may be stored remotely and accessed by the cache server 400. Any data may be loaded into the memory 660 for use by the processor(s) 650 in executing computer-executable code.

The cache server 400 may be configured to access, store, and/or retrieve data in or from one or more datastore(s). For example, in various embodiments, any of the attribute data associated with the ad campaign information 668 may be stored in and accessible from the central datastore(s).

The cache server 400 may also include communications connection(s) that allow the cache server 400 to communicate with datastores, other computing devices or servers, user terminals, and/or other devices via the network(s) 130. For example, the cache server 400 may utilize the radio/antenna 656 to communicate with the ad exchange server 200, the website/ad publisher server 120, and/or the user device(s) 602.

Referring now to the ad server 300, the ad server 300 includes one or more processor(s) 750, one or more network interface(s) 752, one or more input/output ("I/O") interface(s) 754, one or more radio/antenna(s) 756, and one or more memory devices 760. The ad server 300 may also include various additional components, such as one or more input device(s), configured to interact with the I/O interface 754, that allows user 630 to operate the ad server 300. The ad server 300 may also include an operating system configured to provide an interface between software and hardware resources of the ad server 300, and/or database management systems configured to support functionality of the memory 760. The ad server 300 may include system busses that functionally couple various components of the ad server 300. In other embodiments, the ad server 300 may include additional or fewer components.

The memory 760 may include one or more program modules, applications, or the like, such as an optional ad ranking module 762, a bid generation module 764, and a cache user information request module 766. Any of the modules may include one or more sub-modules. For example, the bid generation module 764 may include an ad ranking sub-module. Any of the modules depicted in FIG. 6 may include computer-executable code, instructions, or the like that may be loaded into the memory 760 for execution by one or more of the processor(s) 750. In some embodiments, the memory 760 may include candidate ads 770, including bid data 772 and delivery constraints 774. In other embodiments, the candidate ads 770 may be stored remotely and accessed by the ad server 300. Any data may be loaded into the memory 760 for use by the processor(s) 750 in executing computer-executable code.

The ad server 300 may be configured to access, store, and/or retrieve data in or from one or more datastore(s). For example, in various embodiments, any of the attribute data associated with the candidate ads 770 may be stored in and accessible from the central datastore(s).

The ad server 300 may also include communications connection(s) that allow the ad server 300 to communicate with datastores, other computing devices or servers, user terminals, and/or other devices via the network(s) 130. For example, the ad server 300 may utilize the radio/antenna 756 to communicate with the ad exchange server 200, the website/ad publisher server 120, and/or the user device(s) 602.

Referring now to the functionality of the modules illustrated in FIG. 6, the cache server 400 includes the ad ranking module 662, the ad inventory module 664, and the cache user information module 666.

The ad ranking module 662 may include computer-executable instructions that upon execution by the processor(s) 650 configures the processor(s) 650 to generate a rank or otherwise determine a rank of candidate advertisements based at least in part on user information, such as user attributes. The ad ranking module 662 may rank candidate ads based at least in part on a quality or value of an ad slot, determined with respect to quality metrics, user attributes, and/or an expected value. The ad ranking module 662 may receive quality metrics associated with an available ad slot and may analyze the received ad slot information based at least in part on the quality metrics. In this manner, the ad ranking module may determine a "quality" or value of the ad slot with respect to each ad in the available ad inventory. In certain embodiments, the ad ranking module 662 may generate a "quality score" based on an analysis of the ad slot information. The quality score may provide a quantitative measure of the value represented by the ad slot. In various embodiments, the determination of the quality score may be further based on the ad metrics.

The ad inventory module 664 may include computer-executable instructions that upon execution by the processor(s) 650 configures the processor(s) 650 to request and/or receive available advertising inventory and related targeting criteria. The ad inventory module 664 may determine one or more eligible ads for individual users, where the eligible ads may have a targeting criteria the user falls within. The ad inventory module 664 may further rank eligible ads based at least in part on ad scores or targeting criteria.

The cache user information module 666 may include computer-executable instructions that upon execution by the processor(s) 650 configures the processor(s) 650 to receive user information and/or send cached user information to the ad server 300 in response to a request or periodically. The cache user information module 66 may identify users, for example via user identifiers and may extract user information from bid requests.

The targeting criteria 670 may include information relating to an advertiser indicated target consumer and may include demographic information, chronological information, geographic information, and the like. The ad metrics 672 may include information relating to performance metrics that may be used to measure success or performance of the advertisement. For example, for a particular advertisement, maximizing the click-through rate may be of importance. For another advertisement, a purchase rate or a consideration rate may be the primary metric for measuring success of the advertisement. For yet another advertisement, brand awareness metrics such as the number of actual views of ad impressions, the number of page views of an advertiser's web site or the number of related searches performed may be most important. It will be appreciated that any number/type of ad metrics 672 may be provided. The ad metrics 672 associated with a particular advertisement may influence the bid amount generated for the advertisement in connection with a particular advertising slot. The ad metrics 672 may include information relating to a number of impressions of an advertisement that have been served. The ad metrics 672 may further include information relating to a number of actual views of the ad impressions, a number of clicks, a click-through rate (e.g., a pClick ratio), a purchase rate, a consideration rate, a number of searches, a number of page views (e.g., of advertiser's web sites), and so forth. In various embodiments, the ad metrics 672 may relate to ad performance data associated with ad impressions delivered for the ad campaign information 668.

Referring now to the ad server 300, the ad server 300 includes the ad ranking module 762, the bid generation module 764, and the cache user information request module 766.

The ad ranking module 762 may include computer-executable instructions that upon execution by the processor(s) 750 configures the processor(s) 750 to generate a rank or otherwise determine a rank of candidate advertisements based at least in part on user information, such as user attributes. The ad ranking module 762 may rank candidate ads based at least in part on a quality or value of an ad slot, determined with respect to quality metrics, user attributes, and/or an expected value. The ad ranking module 762 may receive quality metrics associated with an available ad slot and may analyze the received ad slot information based at least in part on the quality metrics. In this manner, the ad ranking module may determine a "quality" or value of the ad slot with respect to each ad in the available ad inventory. In certain embodiments, the ad ranking module 762 may generate a "quality score" based on an analysis of the ad slot information. The quality score may provide a quantitative measure of the value represented by the ad slot. In various embodiments, the determination of the quality score may be further based on the ad metrics.

The bid generation module 764 may include computer-executable instructions, code, or the like, that, responsive to execution by the processor(s) 750, may cause the ad server 300 to select an ad for which to generation a bid. The bid generation module 764 may be further configured to generate probability of conversion calculations for eligible ads, and to rank the eligible ads in accordance with the generated probability of conversions. The bid generation module 764 may further generate a bid for one or more ads, such as a top ranked ad, where the bid amount may be based at least in part on a probability of conversion. The bid generation module 764 may be configured to submit bids in response to bid requests.

The cache user information request module 766 may include computer-executable instructions, code, or the like, that, responsive to execution by the processor(s) 750, may cause the ad server 300 to send a request for cached user information to the cache server 400. The cache user information request module 766 may further be configured to extract user information from a bid request and/or available advertising slot information. The cache user information request module 766 may receive cached user information and may identify eligible ads that a user is eligible to be served, and may further identify pre-ordered rankings if included in the cached user information.

The processor(s) 604, 650, 750 of each component in the system 600 may be implemented as appropriate in hardware, software, firmware, or combinations thereof. Software or firmware implementations of the processor(s) 604, 650, 750 may include computer-executable or machine-executable instructions written in any suitable programming language to perform the various functions described. Similarly, hardware implementations of the processor(s) 604, 650, 750 may be configured to execute computer-executable or machine-executable instructions to perform the various functions described.

The processor(s) 604, 650, 750 of each component in the system 600 may be configured to access the respective memory and execute computer-executable instructions loaded therein. For example, the processor(s) 604, 650, 750 of each component in the system 600 may be configured to execute computer-executable instructions of the various program modules to cause or facilitate various operations to be performed in accordance with one or more embodiments of the disclosure. The processor(s) 604, 650, 750 may include any suitable processing unit capable of accepting data as input, processing the input data in accordance with stored computer-executable instructions, and generating output data. The processor(s) 604, 650, 750 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 604, 650, 750 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 604, 650, 750 may be capable of supporting any of a variety of instruction sets.

The respective network interface(s) 652, 752 of devices in the system 600 may be configured to allow the respective devices to communicate with content providers and other entities over networks (e.g., network(s) 130), such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The respective input/output (I/O) interface(s) 654, 754 of components of the system 600 may facilitate the receipt of input information by the respective devices from one or more I/O devices as well as the output of information from the respective devices to the one or more I/O devices. The I/O devices may include, for example, one or more user interface devices that facilitate interaction between a user and the respective devices including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The radio/antenna(s) 656, 756 may include any suitable type of antenna(s) depending, for example, on the communications protocols used to transmit or receive signals via the radio/antenna(s) 656, 756. Non-limiting examples of suitable antennas may include directional antennas, non-directional antennas, dipole antennas, folded dipole antennas, patch antennas, multiple-input multiple-output (MIMO) antennas, or the like. The radio/antenna(s) 656, 756 may be communicatively coupled to one or more transceiver components to which or from which signals may be transmitted or received. The radio/antenna(s) 656, 756 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas can include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The radio/antenna(s) 656, 756 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the radio/antenna(s) 656, 756 may be configured to transmit or receive radio frequency signals within any suitable frequency range forming part of the unlicensed portion of the radio spectrum.

Each respective memory 606, 660, 760 may store program instructions that are loadable and executable on processor(s), as well as data generated during the execution of these programs. The respective memory 606, 660, 760 of the devices of the system 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 606, 660, 760 may include removable and/or non-removable media which may be implemented in any method or technology for storage of information, such as computer-readable instructions, data structures, program modules, or other data. The components of the system 600 may also include additional removable storage and/or non-removable storage (not shown) including, but not limited to, magnetic storage, optical disks, and/or tape storage. The disk drives and their associated computer-readable media may provide non-volatile storage of computer-readable instructions, data structures, program modules, and other data. In some implementations, the memory 606, 660, 760 may include multiple different types of memory, such as static random access memory (SRAM), dynamic random access memory (DRAM), and/or ROM. Computer-readable storage media may include volatile and/or non-volatile, removable and/or non-removable media implemented according to any method or technology for storage of information such as computer-readable instructions, data structures, program modules, and/or other data.

Additional types of computer storage media that may be present in the user device 602, the ad server 300, the cache server 400, the ad exchange server 200, and/or the ad publisher server 120 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the aforementioned devices. Combinations of any of the above are be included within the scope of computer-readable media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific examples of bid amounts, bid data, ad metrics, delivery constraints, optimization criteria, and/or quality parameters have been presented, it should be appreciated that numerous other examples are within the scope of this disclosure.

It should further be appreciated that components of the systems described herein may include alternate and/or additional hardware, software, or firmware components beyond those described or depicted without departing from the scope of the disclosure. More particularly, it should be appreciated that software, firmware, or hardware components depicted as forming part of the depicted systems are merely illustrative and that some components may not be present or additional components may be provided in various embodiments. While various illustrative program modules have been depicted and described as software or data stored locally, it should be appreciated that functionality described as being supported by the program modules may be enabled by any combination of hardware, software, and/or firmware and may be stored remotely. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

What is claimed is:

1. A method comprising:
receiving, by a server comprising one or more computer processors, a bid request for an ad slot from an ad exchange server, the bid request comprising website context information of the ad slot and an account profile identifier indicative of a user account for which the ad slot is available;
sending, by the server, a cached user information request to a remote server, the cached user information request comprising a request for pre-calculated account profile information for the user that is stored in a cache, the pre-calculated account profile information comprising pre-matched ads eligible for presentation to the user;
receiving, by the server and in response to the cached user information request, cached user information comprising a first eligible ad identifier for a first eligible ad, a first ad score indicative of a relationship between targeting criteria of the first eligible ad and the account profile identifier, a second eligible ad identifier for a second eligible ad, and a second ad score indicative of a relationship between targeting criteria of the second eligible ad and the account profile identifier, wherein the first ad score is a first numerical representation of the relationship between the targeting criteria and the account profile identifier for the first eligible ad, and the second ad score is a second numerical representation of the relationship between the targeting criteria and the account profile identifier for the second eligible ad, and wherein the cached user information comprises a pre-ordered ranking of the first eligible ad and the second eligible ad based on the first ad score, the second ad score, and historical data indicative of a presentation history of the first eligible ad and the second eligible ad to the user;
generating, by the server, a first estimated probability of conversion for presentation of the first eligible ad to the user based on the website context information, the first eligible ad identifier, and the first ad score, the first estimated probability of conversion indicative of a likelihood the first eligible ad will be interacted with;
generating, by the server, a second estimated probability of conversion for presentation of the second eligible ad to the user based on the website context information, the second eligible ad identifier, and the second ad score, the second estimated probability of conversion indicative of a likelihood the second eligible ad will be interacted with;
determining, by the server, that the first estimated probability of conversion is greater than the second estimated probability of conversion;
determining, by the server, a comparison between a rate of ad impression delivery associated with the first eligible ad and a threshold rate of ad impression delivery; and
causing the second eligible ad to be placed at the ad slot for presentation to the user instead of the first eligible ad based at least in part on the comparison.

2. The method of claim 1, further comprising:
  extracting, by the server, the website context information and the account profile identifier from the bid request to generate extracted information; and
  sending, by the server, the extracted information to the remote server with the cached user information request.

3. The method of claim 1, further comprising sending, by the server, a set of candidate ads to the remote server, the set of candidate ads comprising available ad inventory from which ads can be selected for presentation to users, wherein the first eligible ad and the second eligible ad are selected from the set of candidate ads.

4. A method comprising:
  receiving, by one or more servers comprising one or more computer processors, a bid request for an ad slot, the bid request comprising available ad slot information for an ad slot for presentation to a user;
  receiving, by the one or more servers, cached user information from a remote server, the cached user information comprising a first ad identifier for a first ad, a first ad score indicative of a relationship between the first ad and the user, a second ad identifier for a second ad, and a second ad score indicative of a relationship between the second ad and the user, wherein the cached user information comprises a pre-ordered ranking of the first ad and the second ad based on the first ad score, the second ad score, and historical data indicative of a presentation history of the first ad and the second ad to the user;
  generating, by the one or more servers, a first estimated probability of conversion associated with presentation of the first ad to the user based at least in part on the available ad slot information, the first ad identifier, and the first ad score;
  generating, by the one or more servers, a second estimated probability of conversion associated with presentation of the second ad to the user based at least in part on the available ad slot information, the second ad identifier, and the second ad score;
  selecting, by the one or more servers, the first ad for which to generate a bid amount based at least in part on determining that the first estimated probability of conversion is greater than the second estimated probability of conversion;
  determining, by the one or more servers, a comparison between a rate of ad impression delivery associated with the first ad and a threshold rate of ad impression delivery; and
  causing the second ad to be placed at the ad slot for presentation to the user instead of the first ad based at least in part on the comparison.

5. The method of claim 4, further comprising:
  generating, by the one or more servers, a bid amount for the second ad based at least in part on the second estimated probability of conversion; and
  submitting, by the one or more servers, the bid amount in response to the bid request.

6. The method of claim 4, wherein the available ad slot information comprises context information representing context for the ad slot and a user identifier associated with the user.

7. The method of claim 6, further comprising:
  extracting, by the one or more servers, the context information and the user identifier from the available ad slot information to generate extracted information; and
  sending, by the one or more servers, a cached user information request to the remote server, the cached user information request comprising a request for user information of the user and the extracted information.

8. The method of claim 7, further comprising sending, by one or more servers, a set of candidate ads to the remote server, the set of candidate ads comprising available ad inventory from which ads can be selected for presentation to the user, wherein the first ad and the second ad are selected from the set of candidate ads.

9. The method of claim 8, wherein the cached user information comprises a set of eligible ads selected from the set of candidate ads, the set of eligible ads comprising the first ad and the second ad, the set of eligible ads indicative of ads with targeting criteria for which the user meets a threshold level of the targeting criteria.

10. The method of claim 4, further comprising:
  determining, by the one or more servers, that the first ad was previously presented to the user; and
  selecting, by the one or more servers, the second ad for which to generate the bid amount.

11. The method of claim 4, further comprising:
  determining, by the one or more servers, a conversion event indicated by a user interaction with the second ad; and
  sending, by the one or more servers, a user information update event notification to the remote server indicating that the user information associated with the user is to be updated based at least in part on the conversion event.

12. The method of claim 4, wherein the first ad score is based at least in part on behavioral information of the user, context information of the bid request, and demographic information of the user.

13. A computer system comprising:
  at least one memory that stores computer-executable instructions; and
  at least one processor configured to access the at least one memory and execute the computer-executable instructions to:
    receive a bid request for an ad slot, the bid request comprising available ad slot information for an ad slot for presentation to a user;
    receive cached user information from a remote server, the cached user information comprising a first ad identifier for a first ad, a first ad score indicative of a relationship between the first ad and the user, a second ad identifier for a second ad, and a second ad score indicative of a relationship between the second ad and the user, wherein the cached user information comprises a pre-ordered ranking of the first ad and the second ad based on the first ad score, the second ad score, and historical data indicative of a presentation history of the first ad and the second ad to the user;
    generate a first estimated probability of conversion associated with presentation of the first ad to the user based at least in part on the available ad slot information, the first ad identifier, and the first ad score;
    generate a second estimated probability of conversion associated with presentation of the second ad to the user based at least in part on the available ad slot information, the second ad identifier, and the second ad score;
    select the first ad for which to generate a bid amount based at least in part on determining that the first estimated probability of conversion is greater than the second estimated probability of conversion;

determine a comparison between a rate of ad impression delivery associated with the first ad and a threshold rate of ad impression delivery; and cause the second ad to be placed at the ad slot for presentation to the user instead of the first ad based at least in part on the comparison.

14. The computer system of claim 13, wherein the at least one processor is further configured to execute the computer-executable instructions to:

generate a bid amount for the second ad based at least in part on the second estimated probability of conversion; and submit the bid amount in response to the bid request.

15. The computer system of claim 13, wherein the available ad slot information comprises context information representing context for the ad slot and a user identifier associated with the user.

16. The computer system of claim 15, wherein the at least one processor is further configured to execute the computer-executable instructions to:

extract the context information and the user identifier from the available ad slot information to generate extracted information; and send a cached user information request to the remote server, the cached user information request comprising a request for user information of the user and the extracted information.

17. The computer system of claim 16, wherein the at least one processor is further configured to execute the computer-executable instructions to:

communicate with another computer system to deliver a set of candidate ads to the remote server, the set of candidate ads comprising available ad inventory from which ads can be selected for presentation to users, wherein the first ad and the second ad are selected from the set of candidate ads.

18. The computer system of claim 17, wherein the cached user information comprises a set of eligible ads selected from the set of candidate ads, the set of eligible ads comprising the first ad and the second ad, the set of eligible ads indicative of ads with targeting criteria for which the user meets a threshold level of the targeting criteria.

* * * * *